(12) United States Patent
Ertl

(10) Patent No.: US 10,029,637 B1
(45) Date of Patent: Jul. 24, 2018

(54) METHOD FOR TRIGGERING A PLURALITY OF ACTUATORS OF A SAFETY SYSTEM OF A MOTOR VEHICLE

(71) Applicant: Continental Automotive GmbH, Hannover (DE)

(72) Inventor: Ludwig Ertl, Bad Abbach/Peising (DE)

(73) Assignee: Continental Automotive GmbH, Hannover (DE)

( * ) Notice: Subject to any disclaimer, the term of this patent is extended or adjusted under 35 U.S.C. 154(b) by 222 days.

(21) Appl. No.: 15/112,463

(22) PCT Filed: Dec. 17, 2014

(86) PCT No.: PCT/DE2014/200722
§ 371 (c)(1),
(2) Date: Jul. 19, 2016

(87) PCT Pub. No.: WO2015/117581
PCT Pub. Date: Aug. 13, 2015

(30) Foreign Application Priority Data

Feb. 6, 2014 (DE) .................. 10 2014 202 193

(51) Int. Cl.
*B60R 21/01* (2006.01)
*B60R 22/48* (2006.01)

(52) U.S. Cl.
CPC ............. *B60R 21/01* (2013.01); *B60R 22/48* (2013.01); *B60R 2021/01204* (2013.01)

(58) Field of Classification Search
CPC ....... B60R 21/01; B60R 22/48; B60R 21/017; G06F 19/00

(Continued)

(56) References Cited

U.S. PATENT DOCUMENTS

| 4,255,789 A | * | 3/1981 | Hartford | ............... F02D 41/263 |
| | | | | 123/406.65 |
| 6,169,945 B1 | | 1/2001 | Bachmaier | |

(Continued)

FOREIGN PATENT DOCUMENTS

| DE | 19641793 | 4/1997 |
| DE | 19807750 | 3/1999 |

(Continued)

OTHER PUBLICATIONS

International Search Report and Written Opinion of the International Searching Authority for International Application No. PCT/DE2014/200722 dated Apr. 15, 2015, 7 pages.

(Continued)

*Primary Examiner* — Tan Quang Nguyen
(74) *Attorney, Agent, or Firm* — RatnerPrestia

(57) ABSTRACT

A method for triggering a plurality of actuators of a safety system of a motor vehicle from an energy source, wherein, by using sensor signals, the requirement for triggering and the desired triggering time period are determined and a maximum group size of actuators to be triggered within a time window is predefined. For successive time windows, individual, at least partly different, maximum group sizes are respectively predefined and the maximum group size for the respective time window is determined adaptively by using the actuators already actually triggered in preceding time windows. Here, it is preferably also possible to take account of the situation in which different triggering time periods are predefined for actuators.

10 Claims, 1 Drawing Sheet

Index

| Index | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| Norm-Abfolge | 14 | 13 | 12 | 11 | 10 | 10 | 9 | 9 | 8 | 8 | 8 | 8 | 8 | 8 | 8 | 8 | 8 | 8 | 8 |

| | T0 | T1 | T2 | T3 | T4 | T5 | T6 | T7 | |
|---|---|---|---|---|---|---|---|---|---|
| Indexwert | 0 | 3 | 14 | 17 | | | | | |
| maximal | 14 | 11 | 8 | 8 | | | | | |
| Anzahl Soll | 3 | 14 | 0+3 | 0 | | | | | |
| Anzahl Ist | 3 | 11 | 3 | 0 | | | | | |
| zurückgestellt | 0 | 3 | 0 | 0 | | | | | |

(58) Field of Classification Search
USPC .......................................................... 701/45
See application file for complete search history.

(56) References Cited

U.S. PATENT DOCUMENTS

| | | | |
|---|---|---|---|
| 6,560,528 B1 * | 5/2003 | Gitlin | ................. F02D 41/2422 |
| | | | 123/406.62 |
| 7,568,544 B2 | 8/2009 | Hirota | |
| 7,712,776 B2 | 5/2010 | Prakah-Asante | |

FOREIGN PATENT DOCUMENTS

| | | |
|---|---|---|
| DE | 102005008190 | 10/2005 |
| DE | 602005001224 | 1/2008 |
| DE | 102011015531 | 12/2011 |
| EP | 0882624 | 12/1998 |
| EP | 1591309 | 11/2005 |

OTHER PUBLICATIONS

German Search Report for German Application No. 10 2014 202 193.6 dated Jul. 29, 2014, including partial translation, 8 pages.
International Preliminary Report on Patentability and Written Opinion of the International Searching Authority for International Application No. PCT/DE2014/200722 dated Aug. 9, 2016, 6 pages.

* cited by examiner

| Index | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| Norm-Abfolge | 14 | 13 | 12 | 11 | 10 | 10 | 9 | 9 | 8 | 8 | 8 | 8 | 8 | 8 | 8 | 8 | 8 | 8 | 8 |

Fig. 1

|  | T0 | T1 | T2 | T3 | T4 | T5 | T6 | T7 |  |
|---|---|---|---|---|---|---|---|---|---|
| Indexwert | 0 | 3 | 14 | 17 |  |  |  |  |  |
| maximal | 14 | 11 | 8 | 8 |  |  |  |  |  |
| Anzahl Soll | 3 | 14 | 0+3 | 0 |  |  |  |  |  |
| Anzahl Ist | 3 | 11 | 3 | 0 |  |  |  |  |  |
| zurückgestellt | 0 | 3 | 0 | 0 |  |  |  |  |  |

Fig. 2

|  | T0 | T1 | T2 | T3 | T4 | T5 | T6 | T7 |  |
|---|---|---|---|---|---|---|---|---|---|
| Indexwert | 0 | 3 | 13 | 16 |  |  |  |  |  |
| Norm | 14 | 11 | 8 | 8 |  |  |  |  |  |
| Aktiv aus Vorintervall | 0 | 1 | 5 | 2 |  |  |  |  |  |
| maximal | 14 | 10 | 3 | 6 |  |  |  |  |  |
| Anzahl Soll | 3 | 14 | 0+4 | 0+1 |  |  |  |  |  |
| Anzahl Ist neu | 3 | 10 | 3 | 1 |  |  |  |  |  |
| Davon Langzünder | 1 | 5 | 2 | 0 |  |  |  |  |  |
| zurückgestellt |  | 4 | 1 | 0 |  |  |  |  |  |

Fig. 3

METHOD FOR TRIGGERING A PLURALITY OF ACTUATORS OF A SAFETY SYSTEM OF A MOTOR VEHICLE

This is the U.S. National Phase Application of PCT International Application No. PCT/DE2014/200722, filed Dec. 17, 2014, which claims priority to German Patent Application No. 10 2014 202 193.6, filed Feb. 6, 2014, the contents of such applications being incorporated by reference herein.

FIELD OF THE INVENTION

The invention relates to a method for triggering a plurality of actuators of a safety system of a motor vehicle.

BACKGROUND OF THE INVENTION

Today's safety systems for motor vehicles comprise a large plurality of actuators, for example airbags, but also seat belt pretensioners, roll bars or protective equipment for pedestrians. The requirement for triggering and the desired triggering time period are determined by using sensor signals in the control unit. The actuators are triggered thanks to electrical impulses and the energy supply, wherein the quantity of energy required for this and the length of time between the individual actuators can differ and, across the large plurality of actuators, in total, if the actuators are triggered simultaneously, exceeds all of the available energy in the energy source, for example an interconnected ignition capacitor.

For this reason, the triggering is usually carried out in groups having a maximum group size.

SUMMARY OF THE INVENTION

An aspect of the Invention is to indicate such a method, which makes it possible to trigger the individual actuators in as timely a manner as possible, without overloading the available energy source.

One fundamental concept of an aspect of the invention is the fact that a maximum group size of actuators for triggering within a time window is not rigidly predefined, but is adjusted adaptively to the triggering situation. To this end, individual, at least partly different, maximum group sizes are respectively predefined for successive time windows and the maximum group size for the respective time window is determined adaptively by using the actuators already actually triggered in preceding time windows.

Therefore, if less than the maximum possible group size of actuators for this time window is triggered in a preceding time window, a larger maximum group size is produced for the following time window than if, for example, all of the maximum possible actuators had been triggered in the preceding time window.

To this end, a sequence of maximum group sizes is, for example, predefined for each time window and the maximum group size valid for the respective time window is determined by using the number of actuators already actually triggered in preceding time windows.

In a preferred configuration, this Is effected by means of an index-controlled table, in which the sequence of maximum group sizes is stored. The number of actuators already triggered in previous time windows produces the index and the maximum group size is ascertained with reference to the table and by means of the index. In a preferred further development, at least partly different triggering time periods are predefined for the individual actuators and the maximum group size for the respective time window is determined adaptively by using the actuators already actually triggered and the respective triggering time periods thereof.

To this end, in a preferred configuration, the sequence of maximum group sizes is modified as a function of the different triggering time periods of the actuators triggered, in that in the case of an actuator which is to be triggered having a triggering time period which exceeds a time window in the sequence, the maximum group size is respectively reduced in accordance with this exceeding triggering time period in the following time windows in the sequence.

Different priorities are, for example, predefined for the actuators and the actuators are triggered in accordance with the priorities thereof within a time window, and the triggering of a number of actuators exceeding the current, adaptively adjusted maximum group size is postponed into following time windows.

In addition, in a further development, taking account of a recharging of the energy source for the maximum group size, preferably after a predetermined timespan has elapsed, the index is respectively reset by one step.

BRIEF DESCRIPTION OF THE DRAWINGS

The invention will be explained in more detail below by using embodiment examples, partly with reference to the figures, wherein:

FIG. 1 shows an index-controlled table of the sequence of maximum group sizes;

FIG. 2 shows a diagram of a 1st embodiment example; and

FIG. 3 shows a diagram of a 2nd embodiment example.

DETAILED DESCRIPTION OF THE PREFERRED EMBODIMENTS

As shown in FIG. 1, the sequence of maximum group sizes is stored in an index-controlled table and a total of 14 actuators can therefore be triggered for the index value 0, whereas only 13 can be triggered for the index value 1 and so on. The actual values are predefined for specific cases and similar maximum group sizes can definitely be provided as well for multiple index values, as is the case here, for example, as of index value 8 where the maximum group size is always 8 actuators for all of the following index values. However, Individual, at least partly different maximum group sizes are stored for the smaller index values, in particular as the Index Increases decreasing maximum group sizes are stored. The production of such an index-controlled table is permanently stored in a suitable memory of the control unit in a case-specific manner, i.e. for example for a certain series of vehicles or at least the equipment thereof.

In this configuration, the number of actuators already triggered in previous time windows produces the Index and the maximum group size is at least provisionally ascertained with reference to the table by means of the index. In this case, provisionally means that deviations from this fixed table, taking account of other aspects, are again conceivable, for example, because of actuators which have to be triggered for longer than one time window or, for example, due to the possibility of recharging the energy source.

Individual, at least partly different maximum group sizes are respectively predefined for successive time windows and the maximum group size for the respective time window is determined adaptively by using the actuators already actually triggered in preceding time windows, in that a sequence of maximum group sizes is predefined for each time window and the maximum group size valid for the respective time window is determined by using the number of actuators already actually triggered in preceding time windows.

This is now effected, in turn, in this embodiment example in that the number of actuators already triggered in previous time windows produces the index and the maximum group size is ascertained from the index-controlled table for the actual time window based on the index status.

The sequence of maximum group sizes in the Index-controlled table in this embodiment example therefore only corresponds precisely to the sequence of maximum group sizes for successive time windows for exactly that case where exactly one actuator has respectively been triggered—in all other cases the Index status, using the actuators already actually triggered, results in a deviating sequence.

Deviating versions, for example, in the form of a table having provisional maximum group sizes are, in principle, conceivable for time windows which actually succeed one another chronologically, wherein these very provisional values should then always be adjusted by using the actuators already actually triggered.

FIG. 2 is intended to show such a process in more detail by way of an example. If the triggering of a 1st actuator Is detected by the control unit by means of appropriate sensor signals, the Index value at this time T0 is 0 and the maximum group size is deduced on the basis of this index value 0 in the table in accordance with FIG. 1, for example 14 in this case. If, at this time T0, 3 actuators are to be triggered, this number is less than the maximum group size and all 3 actuators can actually be triggered as well, therefore no factor for the triggering has to be deferred to later time windows. Based on the triggering of 3 actuators, the index value is increased in the following time window T1 to 3 and the maximum group size in accordance with the table in FIG. 1 for this time window T1 is therefore 11. If, however, 14 actuators are to be triggered, only a maximum of 11 can actually be triggered and 3 have to be deferred to a later time window. In time window T2 the index value is therefore 14 and, in accordance with the table from FIG. 1, the maximum group size has dropped to 8. In this embodiment example, there are no actuators which are to be newly triggered for time window T2, but there are 3 which have been deferred from the preceding time window and these are now ignited by these accordingly.

Different priorities are, in this case, preferably predefined for the actuators and the actuators are triggered in accordance with their priorities within a time window, i.e. those having the highest priority respectively are triggered first and the triggering(s) of a number of actuators exceeding the current, adaptively adjusted maximum group size is postponed to following time windows. It is in principle also conceivable here that various actuators absolutely have to be triggered with one another such as, for example, in the case of roll bars. Such interconnected actuators are then also accordingly treated the same as one another, if necessary postponed together to the following time window.

In a further embodiment example, different triggering time periods are predefined for the individual actuators. In this case, the triggering time period is preferably predefined in a specified number of those time windows, in which the triggerings also take place. The maximum group size for the respective time window is thereby preferably determined adaptively by using the actuators already actually triggered and the respective triggering time periods thereof, as is to be explained in more detail in the embodiment example in accordance with FIG. 3.

The sequence of maximum group sizes is therefore modified as a function of the different triggering time periods of the actuators triggered, in that in the case of an actuator which is to be triggered having a triggering time period which exceeds a time window in the sequence, the maximum group size is respectively reduced in accordance with this exceeding triggering time period in the following time windows in the sequence.

In this embodiment example as well, the process is preferably carried out with an index-controlled table, in which the sequence of at least provisional maximum group sizes is stored and the number of actuators already triggered in previous time windows produces the index and the provisional maximum group size is ascertained with reference to the table by means of the index, in addition at least the number of actuators having triggering time periods exceeding the last time window is determined and this number is deducted from the provisional maximum group size and the adaptive maximum group size is determined. In this case, the term 'the provisional maximum group size' therefore corresponds to that group size which would be available, if deductions are not to be made for the current time window due to the triggering of actuators having a longer triggering time period.

The process in FIG. 3 again refers to the index table in accordance with FIG. 1 and therefore produces an index value of 0 and a maximum group size of 14 as well as a triggering of a total number of 3 actuators which are to be newly ignited for the starting time T0. One of these actuators is referred to here as a "long fuse" and a value is consequently set or increased in the line "active from the previous interval" for time windows following accordingly. If a "long fuse" only requires an extension for precisely one following time window, the value is increased in precisely just this one field, however even longer extensions can also easily be taken account of, in that the values are accordingly adjusted for additional time windows following accordingly.

The triggering of 3 actuators previously accordingly results in an index value 3 in time window T1 and, therefore, a provisional maximum group size of 11, which is reduced due to the extension of the one "long fuse" by 1, i.e. it Is set to 10. If, at this time, a total of 14 actuators are to be triggered, only 10 can actually be triggered and, in this example, in turn of these 10 a total of 5 are "long fuses" which are to be newly triggered and a total of 4 actuators have to be deferred to following time windows for ignition.

In time window T2 this therefore produces an Index value of 13 actuators actually triggered previously and, therefore, a provisional maximum group size of 8, which must be reduced on the basis of henceforth 5 currently active "long fuses" from the previous interval to a maximum group size of 3.

If, for example, the long fuse from time window T0 were to be Ignited for a total of 3 time windows, this would have also had to be taken account of in time window T2 and the number of active "long fuses" from the previous interval in time window T2 would be 1+5=6.

Even if no new triggering actuators directly occur in time Interval T2, the 4 deferred from the previous time window are to be taken account of and henceforth only 3 of them can be triggered, therefore one actuator must, in turn, be deferred by another time window.

It is also made clear here again that for the proposed process with the index-controlled table and the storage of the active long fuses to be taken account of from the previous interval, only one possible configuration and alternative storage concepts are conceivable.

Different priorities can thereby be predefined, in turn, for the actuators and the actuators are then triggered in accordance with their priorities within a time window and the triggering of a number of lower-prioritized actuators exceeding the current, adaptively adjusted maximum group size is postponed to following time windows.

Taking account again of a recharging of the energy source for the maximum group size, preferably after a predetermined timespan has elapsed, the index can be reset respectively by one step.

Suitable means for carrying out a method are therefore provided in a control unit of a safety system of a motor vehicle for triggering a plurality of actuators from an energy source, in particular an appropriate algorithm is stored, as well as storage means for storing the values, for example the index-controlled table, and the priorities of the different actuators, any existing links between actuators and the characterization of certain actuators as long fuses with their appropriate triggering time periods are stored and are processed accordingly during the operation of the control unit.

The invention claimed is:

1. A method for triggering a plurality of actuators of a safety system of a motor vehicle from an energy source, comprising:
   determining by using sensor signals, a requirement for triggering and a desired triggering time period and
   predefining a maximum group size of actuators to be triggered within a time window,
   wherein for successive time windows, individual, at least partly different, maximum group sizes are respectively predefined and the maximum group size for the respective time window is determined adaptively by using the actuators already actually triggered in preceding time windows.

2. The method according to claim 1, wherein a sequence of maximum group sizes is predefined for each time window and the maximum group size valid for the respective time window is determined by using the number of actuators already actually triggered in preceding time windows.

3. The method according to claim 2, wherein different triggering time periods are predefined for the individual actuators and the maximum group size for the respective time window is determined adaptively by using the actuators already actually triggered and the respective triggering time periods thereof.

4. The method according to claim 3, wherein the sequence of maximum group sizes is modified as a function of the different triggering time periods of the actuators triggered, and in the case of an actuator which is to be triggered having a triggering time period which exceeds a time window in the sequence, the maximum group size is respectively reduced in accordance with this exceeding triggering time period in the following time windows in the sequence.

5. The method according to claim 1, wherein the sequence of maximum group sizes is stored in an index-controlled table and the number of actuators already triggered in previous time windows produces the index and the maximum group size is ascertained with reference to the table by means of the index.

6. The method according to claim 1, wherein
   the sequence of maximum group sizes is stored in an index-controlled table and the number of actuators already triggered in previous time windows produces the index and the provisional maximum group size is ascertained with reference to the table by means of the index, and in addition at least the number of actuators having triggering time periods exceeding the last time window is determined and this number is deducted from the provisional maximum group size and the adaptive maximum group size is determined.

7. The method according to claim 1, wherein different priorities are predefined for the actuators and the actuators are triggered in accordance with their priorities within a time window and the triggering of a number of actuators exceeding the current, adaptively adjusted maximum group size is postponed into following time windows.

8. The method according to claim 1, wherein taking account of a recharging of the energy source for the maximum group size, after a predetermined timespan has elapsed, the index is respectively reset by one step.

9. A control unit for triggering a plurality of actuators of a safety system of a motor vehicle from an energy source having an algorithm and storage means to carry out a method according to claim 1.

10. The method according to claim 1, wherein different triggering time periods are predefined for the Individual actuators and the maximum group size for the respective time window is determined adaptively by using the actuators already actually triggered and the respective triggering time periods thereof.

* * * * *